(12) United States Patent
Lovejoy (10) Patent No.: US 8,165,424 B1
(45) Date of Patent: Apr. 24, 2012

(54) METHOD AND DEVICE FOR VIDEO TRANSFORMATIONS

(75) Inventor: Ian Lovejoy, San Francisco, CA (US)

(73) Assignee: One True Media, Inc., Redwood City, CA (US)

( * ) Notice: Subject to any disclaimer, the term of this patent is extended or adjusted under 35 U.S.C. 154(b) by 1250 days.

(21) Appl. No.: 11/777,857

(22) Filed: Jul. 13, 2007

(51) Int. Cl.
*G06K 9/36* (2006.01)
(52) U.S. Cl. ........ 382/277; 382/274; 382/275; 382/282; 348/14.15; 348/69
(58) Field of Classification Search .................. 382/274, 382/275, 282; 348/14.15, 69
See application file for complete search history.

(56) References Cited

U.S. PATENT DOCUMENTS

| | | | | |
|---|---|---|---|---|
| 6,236,764 B1* | 5/2001 | Zhou | ............................... | 382/266 |
| 6,246,797 B1* | 6/2001 | Castor et al. | ................... | 382/232 |
| 6,278,466 B1* | 8/2001 | Chen | ............................. | 345/473 |
| 6,529,613 B1* | 3/2003 | Astle | ............................. | 382/103 |
| 6,646,655 B1* | 11/2003 | Brandt et al. | ................. | 715/723 |
| 6,690,838 B2* | 2/2004 | Zhou | ............................. | 382/266 |
| 6,741,725 B2* | 5/2004 | Astle | ............................. | 382/103 |
| 6,804,303 B2* | 10/2004 | Kim | ......................... | 375/240.16 |
| 7,356,830 B1* | 4/2008 | Dimitrova | ....................... | 725/51 |

* cited by examiner

*Primary Examiner* — Yosef Kassa
(74) *Attorney, Agent, or Firm* — Schwegman, Lundberg & Woessner, P.A.

(57) ABSTRACT

A system and method use a video transform to produce an intermediate pixel transform file representative of a video effect. The intermediate pixel transform file is applied to a frame of one or more input video streams to generate a frame for a streaming video with the video effect. The intermediate pixel transform file may be stored with stock video in an effect library and used to provide real time streaming video with complex effects in an efficient manner.

16 Claims, 6 Drawing Sheets

|CP: (9, 0)|CP: (8, 0)|CP: (7, 0)|CP: (6, 0)|CP: (5, 0)|CP: (4, 0)|CP: (3, 0)|CP: (2, 0)|CP: (1, 0)|CP: (0, 0)|
|---|---|---|---|---|---|---|---|---|---|
|CP: (9, 1)|CP: (8, 1)|CP: (7, 1)|CP: (6, 1)|CP: (5, 1)|CP: (4, 1)|CP: (3, 1)|CP: (2, 1)|CP: (1, 1)|CP: (0, 1)|
|CP: (9, 2)|CP: (8, 2)|CP: (7, 2)|CP: (6, 2)|CP: (5, 2)|CP: (4, 2)|CP: (3, 2)|CP: (2, 2)|CP: (1, 2)|CP: (0, 2)|
|CP: (9, 3)|CP: (8, 3)|CP: (7, 3)|CP: (6, 3)|CP: (5, 3)|CP: (4, 3)|CP: (3, 3)|CP: (2, 3)|CP: (1, 3)|CP: (0, 3)|
|CP: (9, 4)|CP: (8, 4)|CP: (7, 4)|CP: (6, 4)|CP: (5, 4)|CP: (4, 4)|CP: (3, 4)|CP: (2, 4)|CP: (1, 4)|CP: (0, 4)|
|CP: (9, 5)|CP: (8, 5)|CP: (7, 5)|CP: (6, 5)|CP: (5, 5)|CP: (4, 5)|CP: (3, 5)|CP: (2, 5)|CP: (1, 5)|CP: (0, 5)|
|CP: (9, 6)|CP: (8, 6)|CP: (7, 6)|CP: (6, 6)|CP: (5, 6)|CP: (4, 6)|CP: (3, 6)|CP: (2, 6)|CP: (1, 6)|CP: (0, 6)|
|CP: (9, 7)|CP: (8, 7)|CP: (7, 7)|CP: (6, 7)|CP: (5, 7)|CP: (4, 7)|CP: (3, 7)|CP: (2, 7)|CP: (1, 7)|CP: (0, 7)|
|CP: (9, 8)|CP: (8, 8)|CP: (7, 8)|CP: (6, 8)|CP: (5, 8)|CP: (4, 8)|CP: (3, 8)|CP: (2, 8)|CP: (1, 8)|CP: (0, 8)|
|CP: (9, 9)|CP: (8, 9)|CP: (7, 9)|CP: (6, 9)|CP: (5, 9)|CP: (4, 9)|CP: (3, 9)|CP: (2, 9)|CP: (1, 9)|CP: (0, 9)|

METHOD AND DEVICE FOR VIDEO TRANSFORMATIONS

BACKGROUND

Video is often processed or transformed before display. For example, additional information may be layered on top of the video, special effects may be combined with the video, and when switching from one video stream to another there may be a complex transition between the two streams.

These transformations often involve complex algorithms such as two dimensional (2D) and three dimensional (3D) geometric transformations, ray tracing, and nontrivial distortions of the images. These computations may be very time consuming, and in particular many of them may not be possible to do in real time using conventional computer hardware.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in hardware, software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Video transformations between two video streams are precomputed, and applied quickly, often in real time, using conventional computer hardware. Computation of the video transform is split into two phases: a prerendering phase during which complex computations may be performed, and an application phase, which facilitates rendering of streaming video.

Figure 1:
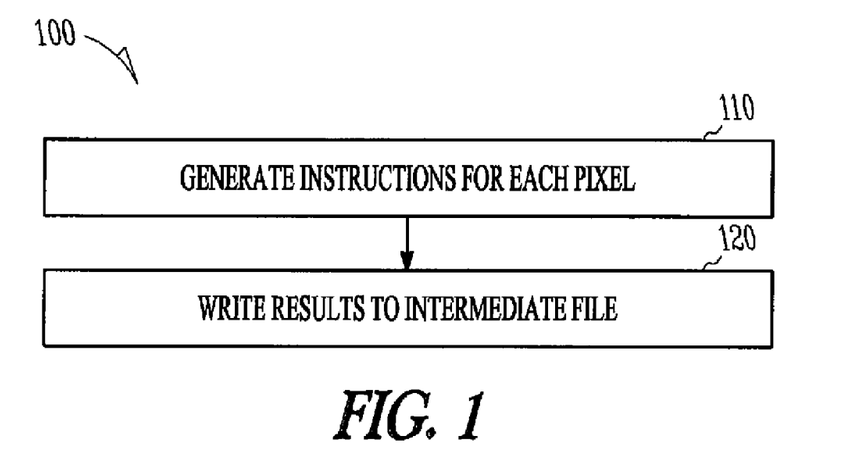
FIG. 1 is a flow chart illustrating generation of an intermediate file for video transformation according to an example embodiment.

During the prerendering phase illustrated at 100 in FIG. 1, computations similar to those performed in conventional video effects rendering may be performed. In one example, algorithms such as 2D and 3D geometric transformations and ray tracing may be used. Instead of applying these computations directly to pixels from a frame of video, individual commands or pre-rendered instructions corresponding to each pixel are generated at 110 and stored at 120 as a result of the computations. Each individual command or commands essentially indicate a pixel value or formula for determining each output pixel. An output pixel may be specified by the commands as a combination of pixels from one or more video stream frames, along with an operation to perform on the combination. This provides a layer of indirection that allows expensive transforms or computations to be applied once only. The results of these computations are written to an intermediate pixel transform file at 120 which is representative of a video effect and stored on a persistent storage device. The technique is not limited to processing a single video stream, but can composite and apply effects to any number of streams.

Figure 2:
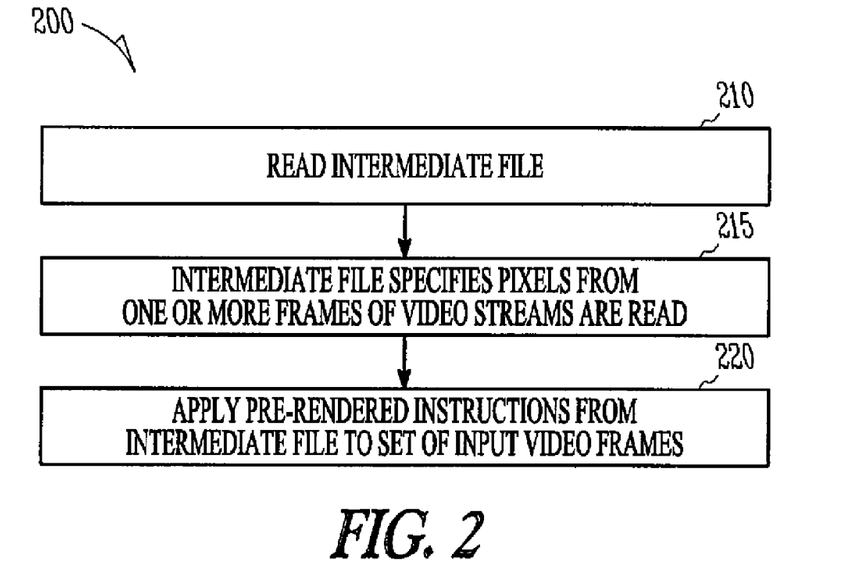
FIG. 2 is a flow chart illustrating use of the intermediate file for video transformation according to an example embodiment.

During the application phase shown at 200 in FIG. 2, the intermediate pixel transform file is read in at 210. At 215, an intermediate pixel transform file specifies that pixels from one or more frames of video streams are read. The pixels may be specified simply by indicating a video source, a frame of the video, and a pixel from the frame. In one embodiment, for an application of an intermediate pixel transform file to produce an output frame, all the pixels pulled from a given video source come from the same input frame, so a separate specification of the frame for each pixel is not needed. Simple read operations may be used to read the specified pixel or pixels from one or more video sources. The pre-rendered instructions from the intermediate pixel transform file are applied at 220 to read pixels. The instructions may be of an extremely simple form and so can be applied very quickly. Examples of instructions with reference to pixel coordinates are:

Take pixel (4, 10) from input frame 0 of video stream 1 and place it at pixel (92, 7) in the output frame Take an 80%/20% weighted average of pixel (4, 10) from input frame 0 of video stream 1 and pixel (56, 104) from input frame 1 of video stream 2 and place the result at pixel (18, 33) in the output frame Place the color black or any other pixel value at pixel (88, 10) in the output image These types of instructions, which in one embodiment, involve only load, store, and simple weighting operations, may execute extremely efficiently. Despite their simplicity, they can express any effect of a set of input frames from one or more video streams. Such effects include but are not limited to transformation, warping, inversion, superposition, creation of multiple copies, scaling, spinning, twisting, rotating, warping, fading in or out, moving in simulated 3D space, displaying on a wall, displaying in a locker, folding into another shape, exploding, burning, melting, being washed away, displaying on a street sign, displaying on a freeway sign, superimposing fireworks, transitioning using sparkles, transitioning using swirls, displaying on a TV set, displaying on a portable media device, displaying as if seen through rippling water, displaying in fish-eye, displaying with bulges, displaying with pinches, pixellating, splitting into parts, shrinking, expanding, displaying inside car window, displaying on billboard, displaying in decorative frame, overlaying with decorative objects (such as rings), and overlaying with "old film" look. Other instructions involving color transformations and other similar operations are easily envisioned. Thus, complex transforms that may initially involve very complex calculations may be performed to arrive at the simple instructions.

ILLUSTRATIVE EXAMPLE

Example 1

Creating a Mirror Image of a Video Stream

This example was chosen for clarity even though creating a mirror image of a video stream is not a computationally expensive operation.

Figure 3:
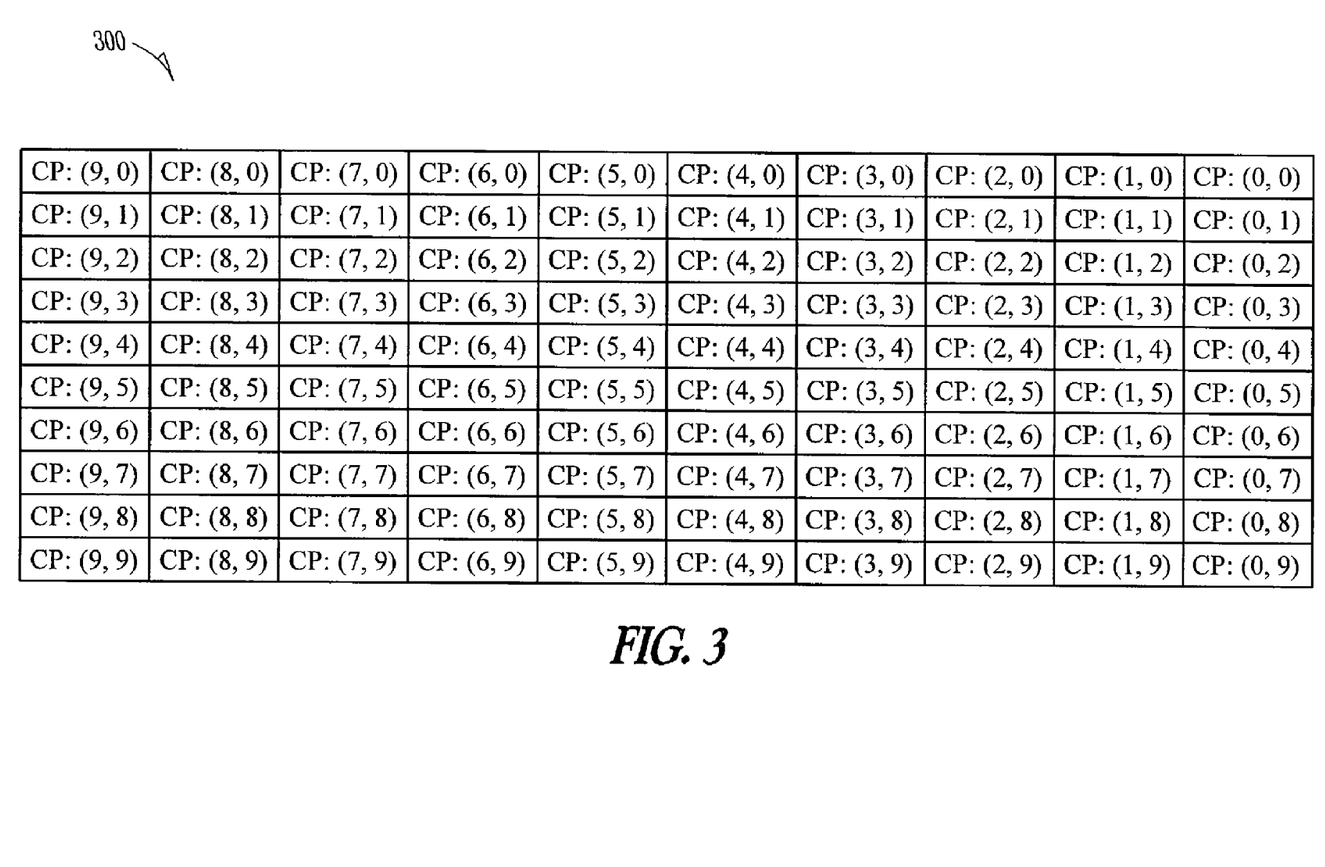
FIG. 3 is an example intermediate file corresponding to instructions for transforming video streams according to an example embodiment.

Consider the set of instructions 300 in FIG. 3, which are computed once and written to an intermediate pixel transform file. The intermediate pixel transform file may be stored on a computer readable medium in one embodiment. The instructions 300 are arranged in a grid format for clarity, though of course the instructions 300 may be a linear stream of bytes in the file, with the position in the stream of data implicitly describing a location of the transformed pixel on a resulting output video frame. In further embodiments, each instruction or set of instructions for a pixel may also expressly specify an output location in a frame for the result of the instructions.

For instructions 300, "CP" stand for a command: "Copy Pixel from input frame 0" with the specified coordinates. The input and output frames are considered to be 10×10 grids of pixels in this simple example. The result in one embodiment is an RGB value for the corresponding pixel location of the command, which corresponds to an output frame.

The leftmost column of pixels 310 in the output frame (x=0) will be taken from the rightmost column of pixels (x=9) in the input frame. The x=1 pixels will be take from the input x=8 pixels, and so on. The output video frame will be the mirror of the input frame.

In this example, the same intermediate pixel transform file may be used for successive frames of the input video to produce a mirror image as an output video stream.

By changing the instructions in successive frames, any desired transformation can be achieved, and furthermore even the most complex transformations can be applied in nearly the same amount of time as the simplest possible transformations. This guaranteed performance level (also known as constant time execution) is another useful property of the technique.

By using different intermediate pixel transform files with different sets of instructions for subsequent video frames, the transformation can vary over time. For example, a video source can be made to rotate in three dimensions, to distort as if being viewed though moving water waves, to split into many pieces as if exploding, or to be progressively replaced by a second video stream. Also, several copies of an input frame or part of an input frame may be made simply by repeated reference to the same pixels. Some effects may repeat over a selected interval. A set of intermediate pixel transform files may be repeatedly executed in a loop for one or more input video streams to produce an output video stream.

Multi-Image Composition of a Pixel

In one embodiment, multiple images may be used to compose or render a pixel. One example of multi-image composition of a pixel with pixel weighting is illustrated at 400 in FIG. 4. At 410, a color accumulator for a frame is initialized to all zeros. For each source pixel to be used as indicated at 415, several steps are performed. At 420, a pixel is retrieved from a source video stream. The pixel is scaled by a weighting factor at 425 and at 430, the result is added to a color accumulator.

Figure 4:
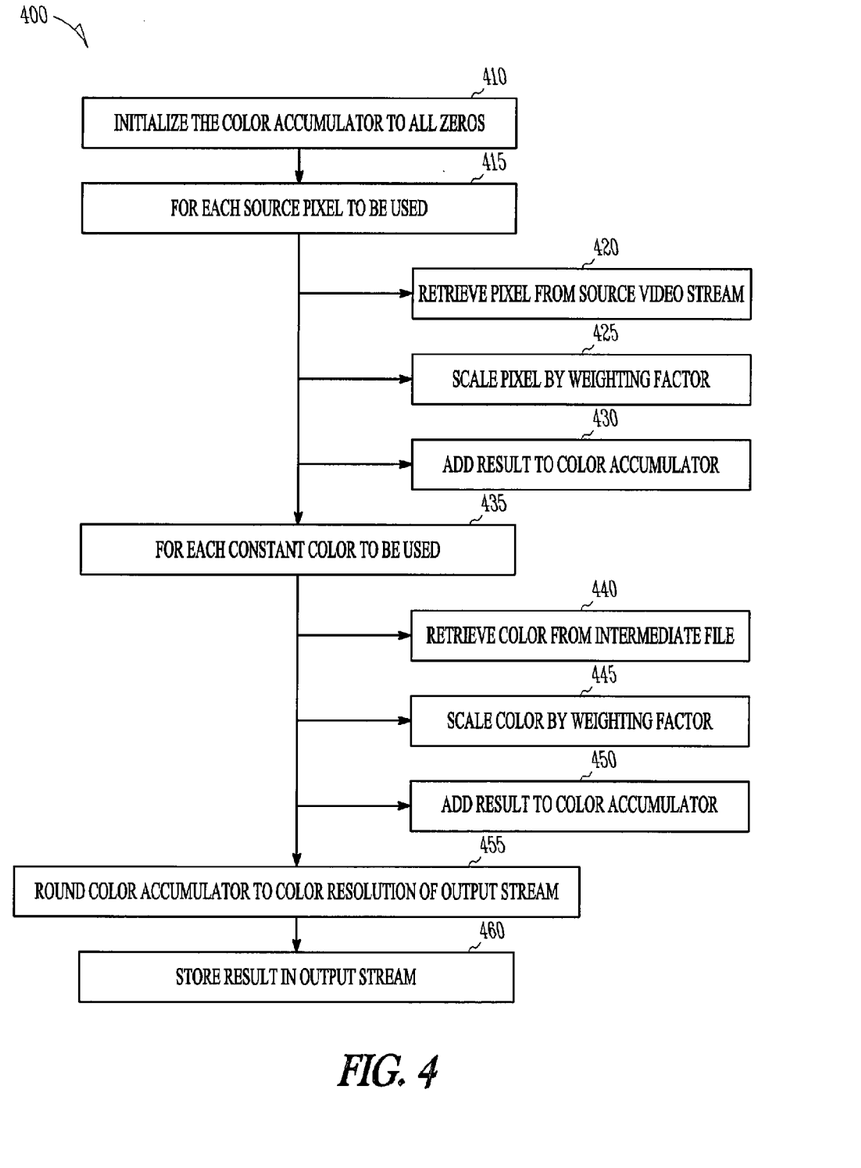
FIG. 4 is a flow chart illustrating multi-image composition of a pixel with weighting according to an example embodiment.

At 435, for each constant color to be used, the color is retrieved from the intermediate file at 440, the color is scaled by a weighting factor at 445, and the result is added to the color accumulator at 450.

At 455, the color accumulator is rounded to a color resolution of the output stream. The result is stored in the output stream at 460.

Compression of the Intermediate Data

The size of the intermediate data may be of the same order of magnitude as an uncompressed video stream. It may be bigger by a certain multiple related to the relative size of an instruction versus a the average size of an explicit color value. For many applications, this amount of data is easily stored and retrieved as is. For other applications, such as those that seek to store a large number of transforms on a platform with limited storage, compressing the intermediate data may be desirable.

Conventional compression algorithms typically compress repeated sets of values. As seen from the above examples this intermediate data typically does not consist of many repeated values. For example, in the mirror image illustration the command "copy pixel" repeats but the pixel coordinates do not repeat at all. Therefore conventional compression algorithms are not likely to provide a high degree of compression.

Many different compression algorithms may be used to compress the intermediate data. In one embodiment, a differential variable bitrate algorithm seeks to take advantage of similarity between vertically adjacent spans of pixels. In this algorithm a horizontal range of pixels is differenced with those immediately above it. An overall (X, Y) offset is stored, and any residual differences between the ranges are encoded using a reduced number of bits. Despite the simplicity of this algorithm, it can highly compress a wide variety of transformations, even some involving extreme distortion of input frames.

Figure 5:
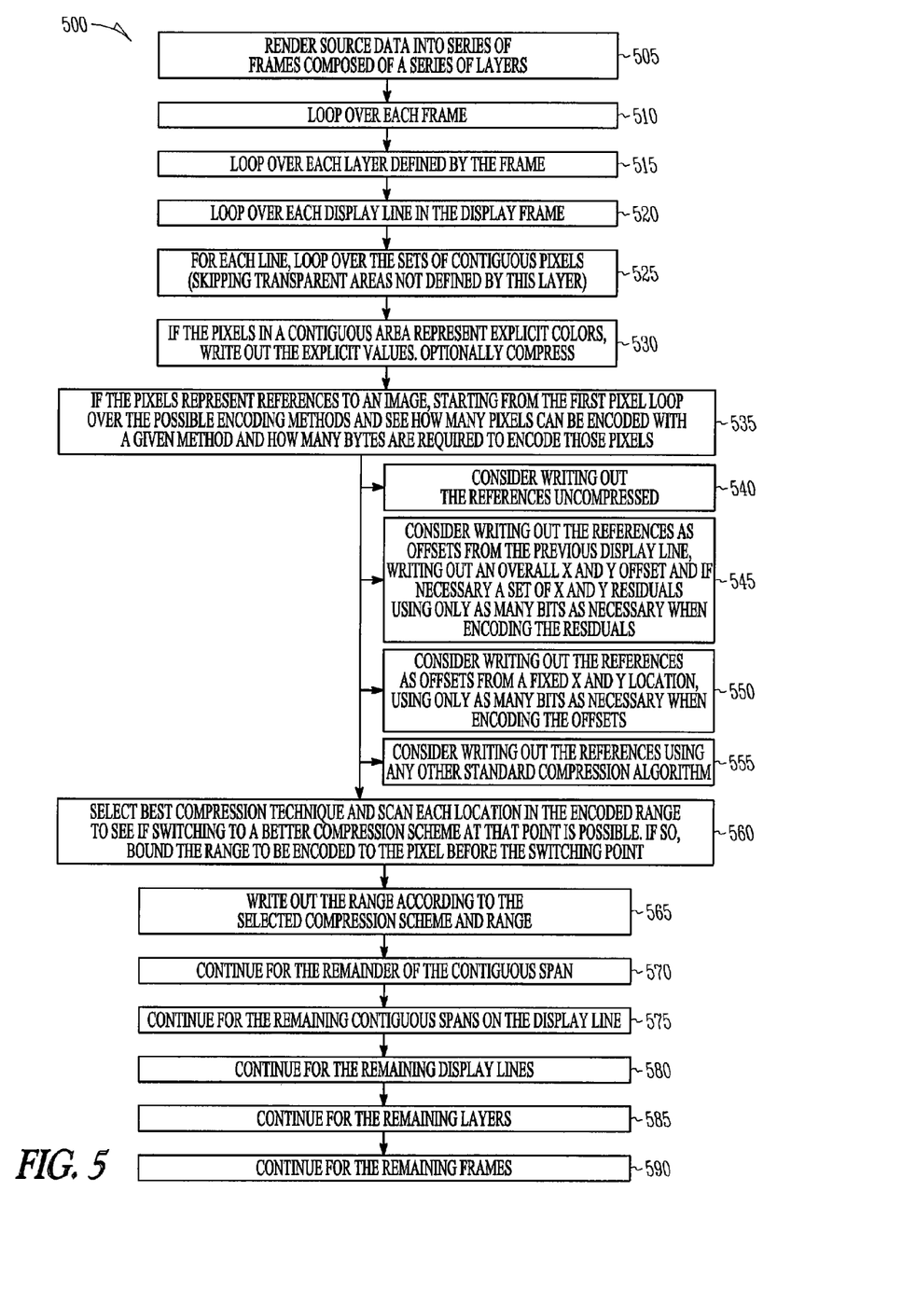
FIG. 5 is a flow chart illustrating a method of compressing intermediate files according to an example embodiment.

In one embodiment, the differential variable bitrate compression algorithm or method indicated generally at 500 in FIG. 5, encodes reference pixels starting in the upper-left corner of the display area, proceeding first horizontally across each row and then vertically through the rows. It achieves compression by exploiting the similarity of horizontal spans of references to the spans immediately above them.

Encoding Differential Variable Bitrate Format

As with other compression formats, many encoding strategies are possible. Method 500 is meant to illustrate one that works well for many circumstances. At 505, the source data is rendered into a series frames, each composed of a series of layers. A layer may contain a set of references to a single image, or it may contain a set of explicit colors. At 510, each frame is looped over. Each layer defined by a frame is also looped over at 515, followed by looping over each display line in the display frame at 520.

At 525, for each line, the method loops over the sets of contiguous pixels (skipping transparent areas not defined by this layer). If the pixels in a contiguous area represent explicit colors, the method writes out the explicit values at 530. These may be uncompressed or may use any standard compression algorithm. At 535, if the pixels represent references to an image, starting from the first pixel the method loops over the possible encoding methods (540, 545, 550, and 555) and sees how many pixels can be encoded with a given method and how many bytes are required to encode those pixels.

At 540, writing out the references uncompressed is considered. At 545, writing out the references as offsets from the previous display line is considered, writing out an overall X and Y offset and if necessary a set of X and Y residuals using only as many bits as necessary when encoding the residuals. At 550, writing out the references as offsets from a fixed X and Y location, using only as many bits as necessary when encoding the offsets is considered. At 555, writing out the references using any other standard compression algorithm may be considered.

When the best compression technique is selected at 560, each location is scanned in the encoded range to see if switching to a better compression scheme at that point is possible. If so, the range is bounded to be encoded to the pixel before the switching point.

At 565, the range is written out according to the selected compression scheme and range. The method continues at 570 for the remainder of the contiguous span. The method also continues for the remaining contiguous spans on the display line at 580, for the remaining layers at 585 and for the remaining frames at 590.

In further embodiments, many variations on this method are possible: Among the variations, the order of encoding the pixels can be varied. The sequence in which the data is stored in the intermediate file and the sequence in which the decompression steps are applied may be varied. A variable number of bits per pixel may be used for the residual offsets, using any variable bit count compression scheme. The pixel references for different input streams may be stored either interleaved or in layers. Lossy compression may be used if the application requirements permit it. The method may also be intermixed with other compression algorithms in a hybrid scheme. There may be many ways to encode data in this manner, and the following decoding method 600 illustrated in FIG. 6 may be used to decode such compressed data in one embodiment.

Figure 6:
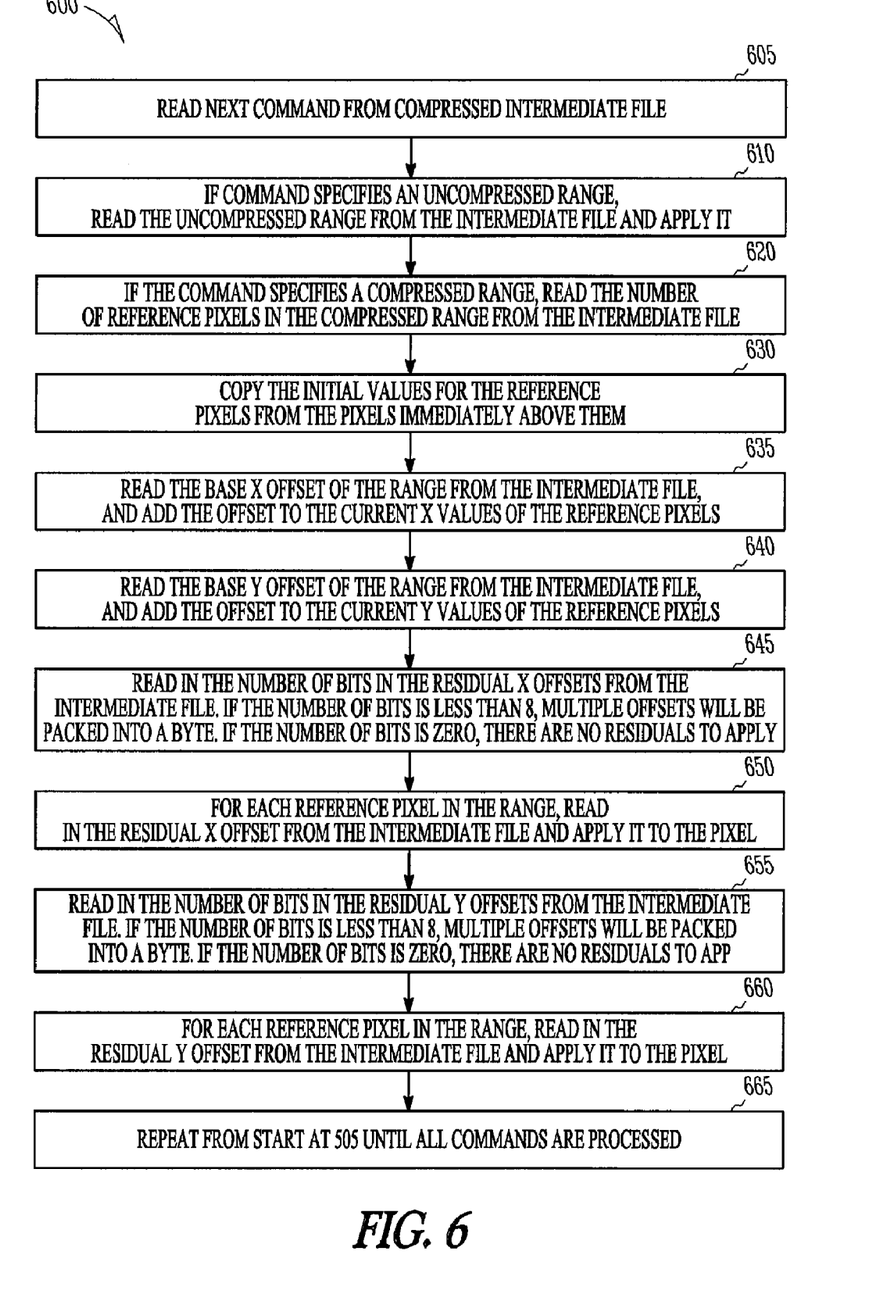
FIG. 6 is a flow chart illustrating a method of decompressing intermediate files according to an example embodiment.

At 605, a next command is read from compressed intermediate file. If the command specifies an uncompressed range at 610, the uncompressed range is read from the intermediate file and applied. If the command specifies a compressed range at 620, the number of reference pixels in the compressed range from the intermediate file is read at 625. At 630, initial values for the reference pixels are copied from the pixels immediately above them. At 635, the base X offset of the range is read from the intermediate file, and the offset is added to the current X values of the reference pixels. At 640, the base Y offset of the range is read from the intermediate file, and the offset is added to the current Y values of the reference pixels. The number of bits in the residual X offsets is read from the intermediate file at 645. If the number of bits is less than 8, multiple offsets will be packed into a byte. If the number of bits is zero, there are no residuals to apply. At 650, for each reference pixel in the range, the residual X offset is read from the intermediate file and applied to the pixel. At 655, the number of bits in the residual Y offsets from is read from the intermediate file. If the number of bits is less than 8, multiple offsets will be packed into a byte. If the number of bits is zero, there are no residuals to apply. At 660, for each reference pixel in the range, the residual Y offset is read from the intermediate file and applied to the pixel. At 665, method 600 is repeated until all commands are processed.

Many variations on method 600 may be used in various embodiments. The order of encoding the pixels can be varied. The sequence in which the data is stored in the intermediate file and the sequence in which the decompression steps are applied may be varied. A variable number of bits per pixel may be used for the residual offsets, using any variable bit count compression scheme. The pixel references for different input streams may be stored either interleaved or in layers. Lossy compression may be used if the application requirements permit it. It may be intermixed with other compression algorithms in a hybrid scheme.

Figure 7:
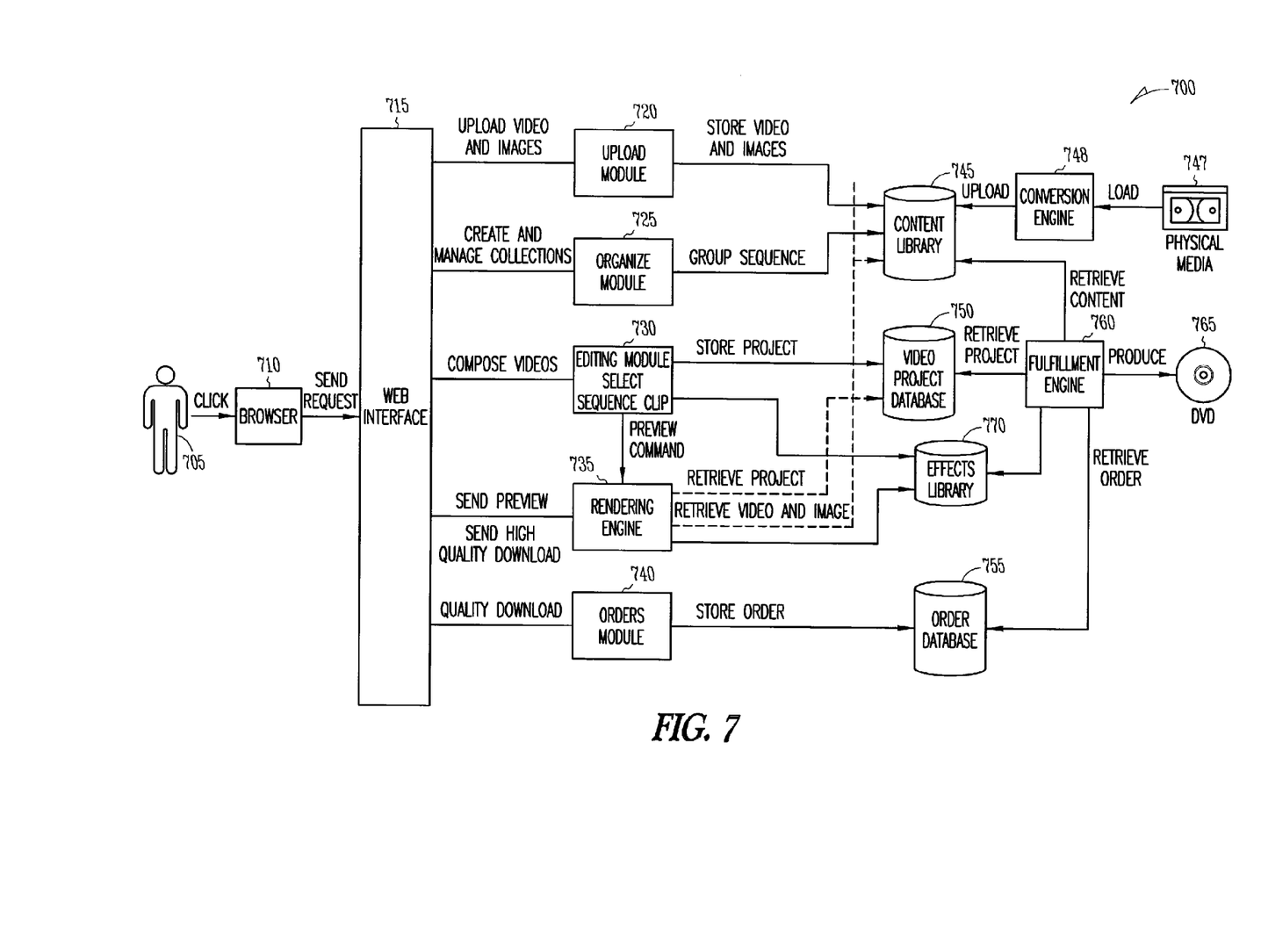
FIG. 7 is a block diagram of a server based video editing system according to an example embodiment.

A block diagram of a computer system that executes programming for performing the above algorithm is shown in FIG. 7. A web based video editing system is indicated generally at 700. A user 705 may access the system 700 via a computer 710 or other device that is capable of running a browser. The user may send a request to a web interface 715, which provides interfaces to the user for many different video editing functions as illustrated by multiple modules. An upload module 720 provides functions for uploading digital content, such as video and images from digital media coupled to the user computer 710. In one embodiment, the upload module 720 normalizes the data, such as JPEG for images and MPEG2 for video and at the same time produces a down resolutioned version. Many other different video and image formats may be used, such as PNG and H.264, or whatever other coder/decoder format desired that provides good quality. The down resolutioned version, or lower resolution version may be used for editing and real time rendering for viewing over a network connection. In one embodiment, the down resolutioned version uses a compressed video format and compressed image format. Along with video and images, other media types or content types may also be used, such as text, which may be edited in various embodiments. Content may be uploaded by dragging and dropping or other methods in various embodiment.

An organize module 725 represents organizing functions that allow users to create and manage collections of digital content. The collections may be named and optionally searched for keywords, or even using image recognition, such as facial recognition to find desired content. An editing module 730 represents editing functions that allow the user to compose videos, such as by selecting digital content, sequencing it and clipping it. Such videos and other content, such as books, may be stored as projects. Content may be copied and/or transferred between various projects and collections. Many different functions may be provided and associated with specific digital content as described in examples below. Tools may be provided in menus that are associated directly with the content to which they apply. Thus, a different menu may appear when editing an image as opposed to a video clip, since different editing functions may apply to each.

A rendering engine 735 is also coupled to the web interface to enable the user to view previews of digital content being edited, such as a video sequence. An orders module 740 allows the user to place an order via the web interface 715. A content library 745 is a digital storage library, such as network attached storage, that stores video clips, images and music from upload module 720 and from other physical media as represented at 747. Physical media may be sent via mail to the conversion engine for uploading in one embodiment. An email may be sent to the user when the conversion and upload is completed, and the media returned to the user.

In one embodiment, a file system is used to store content for each user in a separate directory for each user. Physical media 747 may represent an analog video tape that may be run through a conversion engine 748. The conversion engine 748 may convert content from the physical media 747 to a selected digital format for storage in content library 745. In one embodiment, the content library 745 stores multiple normalized versions of the content. A higher resolution version is used for creating a final high resolution output. A lower resolution version is used for use in streaming the content.

A video project database 750 is coupled to the editing module 730, and stores projects that may be created by the user. A project may correspond to one particular event or subject for which a user may be creating and editing a video or video composition. For instance, a birthday party or graduation, or any other type of project utilizing digital content. The video project database 750 is a database in one embodiment that stores metadata for the project, such as titles and descriptions.

An order database 755 is coupled to the orders module 740, and stores orders. The orders may be communicated to a fulfillment engine 760, which retrieves orders, retrieves corresponding projects from project database 750 and source content from content library 745. In one embodiment, the project database contains lower resolution versions of video and images on which editing is performed. The editing may result in time stamps and metadata corresponding to editing of the lower resolution versions of the video and images. The fulfillment engine retrieves the source content and applies the metadata corresponding to time stamps in the lower resolution versions to the higher resolution video and images to produce an end product, such as a physical media 765 containing the resulting project. One or more copies of the physical media 765 may be mailed as specified in the order database.

In one embodiment, the lower resolution video and images are used by the rendering engine 735 to provide the previews to the user editing the project, and may also be used to provide previews to other users, who may have been given a link by the creating user. Such preview versions can be embedded in a Flash app or other viewing technology that contacts a network server for a corresponding video feed. A preview version that has been rendered, may be stored and streamed as desired. Further editing may result in a re-rendering of the video and images to create a new preview version.

In a further embodiment, the rendering engine 735 is coupled to an effects library 770. The effect library 770 may include professional video stock and intermediate pixel transform files produced by editing module 730, or from a back end system separate from the web based video editing system 700. The rendering engine 735 in one embodiment retrieves the intermediate pixel transform file, video stock and user video or other selected video streams and renders a streaming output video to the user browser 710. Since potentially complex effects have been pre-calculated and embodied in commands/instructions in the intermediate pixel transform file, the streaming video may be output with minimal computing resources required regardless of the complexity of the effects. In further embodiments, the fulfillment engine 760 may produce high resolution versions of the same effects and source video streams.

Execution on the server takes advantage of large storage capabilities of system 700, yet does not consume significant processing resources due to the pre-calculation of the complex effects that are reflected in the commands included in the intermediate pixel transform file. In one embodiment, one of the input video streams may be professional content. One example includes a video of a school locker being opened. The intermediate pixel transform file contains commands to retrieve video from user content to place in an opening of the locker as it is being opened. The intermediate pixel transform file thus may include or contain commands to retrieve pixels of the locker from the professional content, and to retrieve pixels from the user content for the opening of the locker. If desired, other lockers may be opened revealing content retrieved from a further video stream or still picture if desired. The same type of effect may be used to fill picture frames as the professional content pans a room of picture frames. The picture frames may be filled with content from multiple video or still files. Such content from multiple video of still files may be appropriately sized by the intermediate pixel transform file commands to fit within the desired region of the professional content to achieve a desired effect.

Effect library 770 may contain many different intermediate pixel transform files. The intermediate pixel transform files can use one or more video streams as input, transform them with low resource requirements and produce an output video stream with desired effects. Some intermediate pixel transform files may be associated with existing stock content, such as professional content or user content. Commands for pixels in the intermediate pixel transform file may specify retrieval of specific pixels from specific stock content. The intermediate pixel transform file thus is pre-calculated with respect to the specific stock content. An example might be the above picture frame example, where the stock content has specific locations of the picture frames that are mapped to each intermediate pixel transform file. In still further embodiments, the intermediate pixel transform files may not be associated with any stock content. The above mirror image intermediate pixel transform file is an example, as it only refers to pixels of the video on which the effect is desired. It does not need to refer to any stock video in order to produce the mirror effect on an input video.

In a further embodiment, users may create stock content for storage in effect library 770. This stock content may be shared with other users on a fee basis or otherwise as desired.

In still further embodiments, intermediate sample transform files may similarly be produced for any precomputation in which elements operated on are references to content unknown at the time of the precomputation. Still pictures or for audio signals are some examples. With respect to still pictures, the intermediate file may be used to directly map the still picture on a pixel by pixel basis. For audio files, effects on a single audio stream or multiple audio stream may be performed in the same manner as with respect to multiple frames of video. In other words, instead of a conversion command for each pixel, a conversion command may be provided for different aspects of audio signals. One example may be a reverberation, which may involve superposing samples of audio content from different points in time.

Conclusion

Using the above described methods, in one embodiment, content, which may include professional content, may be processed once during import (prerendering phase). The processing may be quite complex, but produces a set of intermediate pixel transform files, which may be compressed for efficient transmission. The files can then be used to combine an arbitrary user's data with the professional content in real time. Many 3D, perspective, and transparency effects are easily achieved. Many video streams may also be combined.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
   using a video transform to produce an intermediate pixel transform file representative of a video effect; and applying the intermediate pixel transform file to a frame of a first input video stream and a frame of a second input video stream to generate a frame for a streaming video with the video effect.

2. The method of claim 1 wherein the intermediate pixel transform file comprises pre-rendered instructions for pixels of the first and second input video streams.

3. The method of claim 2 wherein the pre-rendered instructions are representative of effects selected from the group consisting of transformation, warping, inversion, or superposition of the set of input frames.

4. The method of claim 2 wherein the intermediate pixel transform file provides a layer of indirection that allows a complex transform to be calculated once, with the intermediate pixel transform file adapted to be applied to different video streams.

5. The method of claim 2 wherein pixels form the first and second video streams are read and manipulated in accordance with the pre-rendered instructions.

6. The method of claim 5 wherein the intermediate pixel transform file comprises a stream of pre-rendered instructions for pixels of a frame, and wherein the position of the pre-rendered instructions in the stream implicitly identify locations in the frame for pixels resulting from execution of the pre-rendered instructions.

7. The method of claim 1 wherein the transform is selected from the group consisting of two dimensional and three dimensional geometric transformations, and ray tracing.

8. The method of claim 1 and further comprising compressing and storing the intermediate pixel transform file.

9. The method of claim 8 wherein the intermediate pixel transform file is compressed using a differential variable bitrate algorithm using differencing between adjacent spans of pixels.

10. The method of claim 1 wherein the intermediate pixel transform file is also applied to a third input video stream.

11. A method comprising:
retrieving an intermediate pixel transform file having pre-rendered instructions for pixels of a video frame representative of a video effect;
applying the pre-rendered instructions of the intermediate pixel transform file to pixels in a frame of a first input video stream to generate pixels for an output frame for a streaming video with the video effect.

12. The method of claim 11 and further comprising repeating retrieving and applying to successive intermediate pixel transform files and input video frames to produce multiple output video frames.

13. The method of claim 12 and further comprising streaming the multiple output video frames to a user via a network in real time.

14. The method of claim 11 wherein the successive intermediate pixel transform files may be looped to produce a repeating effect in the multiple output video frames.

15. The method of claim 11 and further comprising decompressing the retrieved intermediate pixel transform file to obtain the pre-rendered instructions that are compressed.

16. The method of claim 15 wherein decompressing comprises determining if a command specifies a compressed range, and if so, reading reference pixels in the compressed range and copying initial values for the reference pixels from pixels immediately above them.

* * * * *